(12) United States Patent
Weisgerber

(10) Patent No.: US 8,749,752 B2
(45) Date of Patent: Jun. 10, 2014

(54) COMPACT ACQUISITION FORMAT FOR DIMENSIONALIZED DIGITAL CINEMA PROJECTION AT FORTY-EIGHT IMAGES PER SECOND

(76) Inventor: Robert C. Weisgerber, New York, NY (US)

( * ) Notice: Subject to any disclaimer, the term of this patent is extended or adjusted under 35 U.S.C. 154(b) by 955 days.

(21) Appl. No.: 11/796,411

(22) Filed: Apr. 28, 2007

(65) Prior Publication Data
US 2008/0266522 A1    Oct. 30, 2008

(51) Int. Cl.
*G03B 41/00*    (2006.01)

(52) U.S. Cl.
USPC .............................. 352/40; 352/84; 352/239

(58) Field of Classification Search
USPC ........ 352/41, 44, 46, 81, 84, 239, 92, 236, 97
See application file for complete search history.

(56) References Cited

U.S. PATENT DOCUMENTS

| | | | | |
|---|---|---|---|---|
| 3,396,021 A | * | 8/1968 | Monteleoni et al. | 352/44 |
| 3,637,297 A | * | 1/1972 | Yoshida | 352/38 |
| 3,639,045 A | * | 2/1972 | Haefeli | 352/37 |
| 3,751,144 A | * | 8/1973 | Greger | 352/38 |
| 3,865,738 A | * | 2/1975 | Lente | 352/44 |
| 4,889,423 A | * | 12/1989 | Trumbull | 352/46 |
| 5,096,286 A | * | 3/1992 | Weisgerber | 352/40 |
| 5,153,620 A | * | 10/1992 | Songer | 352/38 |
| 5,534,954 A | * | 7/1996 | Vetter | 352/79 |
| 5,739,895 A | * | 4/1998 | Vetter | 352/79 |
| 6,243,156 B1 | * | 6/2001 | Weisgerber | 352/46 |
| 7,053,927 B2 | * | 5/2006 | Jones et al. | 348/97 |
| 2002/0163657 A1 | * | 11/2002 | Bogdanowicz et al. | 358/1.9 |
| 2003/0016750 A1 | * | 1/2003 | Cok | 375/240.16 |
| 2003/0169404 A1 | * | 9/2003 | Weisgerber | 352/60 |
| 2005/0254011 A1 | * | 11/2005 | Weisgerber | 352/84 |
| 2006/0072073 A1 | * | 4/2006 | Weisgerber | 352/86 |
| 2006/0244917 A1 | * | 11/2006 | Weisgerber | 352/84 |
| 2007/0085910 A1 | * | 4/2007 | Anderle et al. | 348/223.1 |
| 2009/0027549 A1 | * | 1/2009 | Weisgerber | 348/441 |

* cited by examiner

*Primary Examiner* — William C Dowling
(74) *Attorney, Agent, or Firm* — David Peter Alan

(57) ABSTRACT

Motion picture images are photographed at forty-eight frames per second, onto motion picture film in the thirty-five millimeter, two-perforation format. These film images are then converted to digital images and re-sized to accommodate an aspect ratio used for wide-screen motion picture exhibition. During exhibition, the images are projected digitally in the 1080 by 2048 or other commercially-used digital exhibition format. The server used for such exhibition is 3D compatible, although the interleaving feature used for three-dimensional exhibition is not used in the present invention. Instead, forty-eight discrete images are projected during each second, matching the forty-eight discrete images per second originally photographed on motion picture film in the practice of this invention. Thus, the present invention combines advantages of film photography in an economical film format with advantages of digital exhibition to theatrical motion picture audiences.

15 Claims, 2 Drawing Sheets

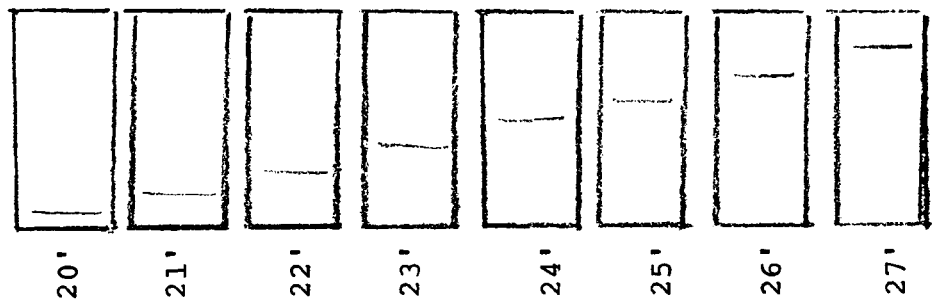
Fig. 3B
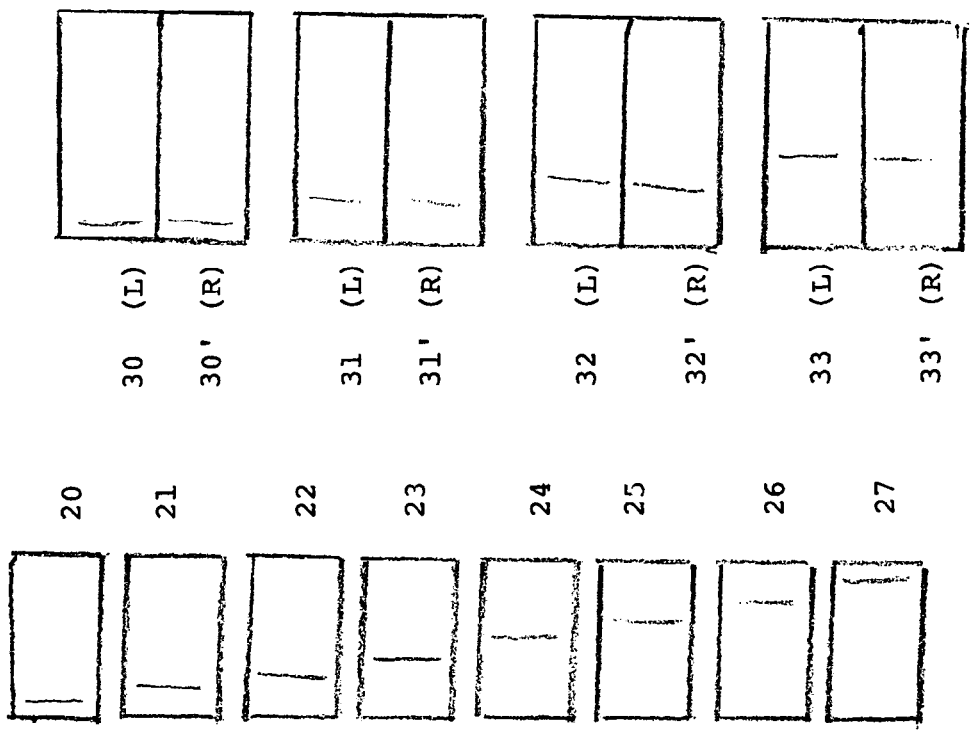
Fig. 3A
Fig. 2
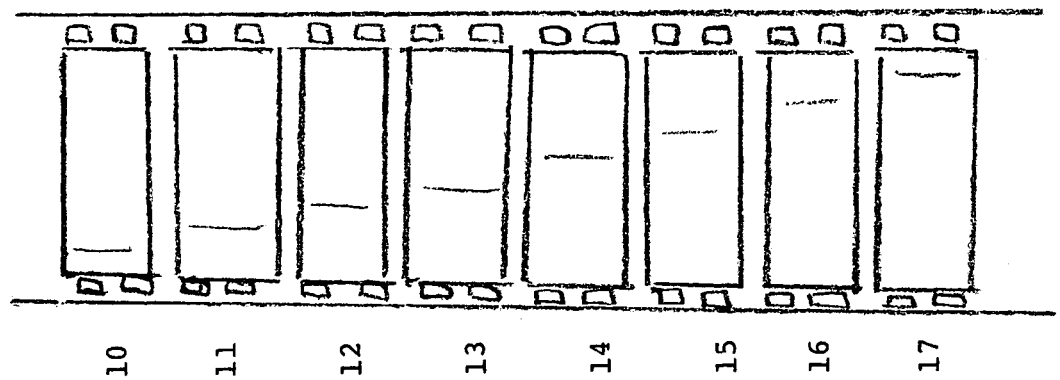
Fig. 1

COMPACT ACQUISITION FORMAT FOR DIMENSIONALIZED DIGITAL CINEMA PROJECTION AT FORTY-EIGHT IMAGES PER SECOND

BACKGROUND OF THE INVENTION

Today, two cinematic technologies are in use, analog (conventional film) and digital. While digital cinema technology may soon eclipse film use in the industry, it is advantageous to explore the benefits of both and make the best use of the two technologies currently available. The invention described here does this by combining a specific film format for the capture of images (acquisition) and digital projection for exhibiting those same images. In the method to be described, a "best of both" result is achieved.

Sometimes an older technology can store more information than it can recover and display. As an example, early (before 1925) sound recordings were made acoustically. The recording process actually imparted more sound information onto the record than acoustical playback could reproduce. The capability was not known until electrical amplifiers became the "new" playback technology in the 1920s. People listening to acoustically-recorded phonograph records through an electrical playback system experienced a palpable improvement when listening to acoustically-recorded records, compared to playing the same records acoustically.

Similarly, it has been demonstrated that the information storage capacity of film as a medium for the acquisition of photographic images can exceed the amount of information that conventional film projection can display. Accordingly, it is the primary objective of this invention to combine image acquisition through use of film with image exhibition by digital means, so that the full information storage capacity of film can be successfully displayed to theatrical motion picture audiences. In short, using today's most modern color film with the latest emulsions available allows sufficient information storage to deliver information packing density comparable to photography in a larger film format, or digital photography with a large pixel count, as practiced in the conventional art.

The native resolution of contemporary 35 mm film, in the 2-perforation format used in the practice of the invention, along with digital post-production, is sufficient to allow it to be used effectively for digital projection at 48 frames-per-second in the 2K level of content (1080 pixels high and 2048 pixels wide). In practice, the native resolution of the 35 mm, 2-perforation format is sufficient to produce a viewing experience comparable to that delivered by film projection in the historical 70 mm, 5-perforation, format at 24 frames-per-second. Images processed at 2K and 48 frames-per-second produce comparable temporal and spatial resolution to 4K. This comports with the requirements of contemporary motion picture theater installations, where screens are often at least 50 feet wide, and can be up to 90 feet wide.

The film format used in the preferred embodiment of the invention is 35 mm with two perforations per frame. The resulting image is this format is only half the height of the conventional 35 mm (4-perforation) image. This format, known in the 1960s as Techniscope, had the advantage of being able to capture a film image with only half the amount of film required to capture the same image on conventional 35 mm (4-perforation format) film. The image size was 0.868 by 0.373 inches or 22 by 9.46 mm in the 2-perforation format. In the invention described here, use of the 35 mm, 2-perforation format not only improves economy of production, but it also facilitates "shooting" operations by allowing twice as many images to be recorded on the same amount of film stock as could be achieved with conventional 35 mm film.

The Techniscope format did not use the entire width of the film strip between the rows of sprocket holes, to allow for the preferred aspect ratio. A later format, developed by Panavision, Inc., featured a slightly larger image than Technicscope, but also did not use the entire width available for picture information. If the full width had been used, as is proposed in the invention described here, an aspect ratio in the range of 2.35:1 to 2.4:1 (comparable to CinemaScope) to as wide as 2.61:1 (comparable to Cinerama) could be achieved.

A 35 mm, 2-perforation format has been used before, but not with the results that the present invention delivers. The original Techniscope format from the 1960s required anamorphic expansion for CinemaScope (aspect ratio of 2.4 to 1) presentation, but saved on the cost of raw film stock. That method was cost-effective, but the quality of presentation was not as good as that available with the conventional 35 mm, 4-perforation format.

The format was originally used to double the amount of time during which photographic images could be captured on a single camera load, resulting in the economical use of film stock. A standard 35 mm raw stock roll contains 1000 feet of film. At twenty-four frames per second, the film travels at a rate of 92 feet per minute, for a potential shooting time of 10 minutes and 52 seconds. Use of the 2-perforation format permits 21 minutes and 45 seconds of action to be captured on the same roll of film in the conventional art. The present invention requires that forty-eight images be photographed every second. Using the standard 4-perforation format for 35 mm film, a 1000-foot roll could permit shooting for only slightly more than five minutes. With the 2-perforation format as described, a roll of film allows as much shooting time as can be obtained through use of the 4-perforation format in twenty-four frame-per-second photography. Accordingly, it is an objective of the present invention to achieve the economy and operational improvement available with the 2-perforation film format in a contemporary operating scenario with state-of-the art exhibition methods at forty-eight frames per second. The improved economy in consumption of film stock also delivers the additional benefit that it is not necessary to change film as often when the format described here is used for 48-frame-per-second capture, compared to the conventional 4-perforation 35 mm or larger film formats. When a film magazine can accommodate twice the shooting time than is available at 48 frames per second with the conventional format, it is necessary to change film in the camera only half as often. This allows longer scenes to be photographed, as well as saving on effort and costs of labor.

Since the 1960s, the 2-perforation format has been used for two applications, economy of film use and three-dimensional (3D) presentation. With its aspect ratios in the range of 2.35:1 to 2.4:1, it saw use in production of motion pictures for exhibition in anamorphically-projected wide-screen formats. Images were stretched to the 4-perforation aspect ratio in an optical printer for storage in the conventional 4-perforation 35 mm format, and then anamorphically stretched in the horizontal direction to deliver a wide-screen CinemaScope-compatible presentation. The format was also used for three-dimensional presentation with successive images shown for the left eye and right eye, known as "over and under" format. The 2-perforation format lent itself to 3D, since each image for the left eye, in addition to its companion image for the right eye used the same amount of film stock as a conventional motion picture in 35 mm film format. The invention uses much of the structure of digital cinema 3D presentation known in the art, but modifies it to produce a result that delivers an improved, but different, presentation compared to 3D exhibition as known in the art. The current invention uses a progressive frame display to render a 48-frame-per-second presentation, rather than alternating frames for each eye, 24 right and 24 left, as is done for 3D presentation.

Today, film is capable of storing more information than was possible in the 1960s. The resolution level of contemporary motion picture film is considerably greater than the capability of film then in use. In addition, digital techniques now known in the art produce more efficient image transfer than was available at the time. Digital image treatment can also improve image sharpness while removing undesirable artifacts, such as grain and instability, to name just two. Therefore, digital imaging and exhibition techniques can deliver more picture information to a theatrical motion picture audience using images acquired in the 35 mm, 2-perforation film format than could be delivered to audiences of the past, utilizing the film techniques in effect when the format was initially used.

The invention described here is a hybrid process, using both film and digital techniques; film for image capture, and digital techniques for post-production and projection. After the images are photographed on film, they are scanned, to convert them to digital images. All steps occur at the frame rate of 48 frames-per-second in the preferred embodiment of the invention.

Yoshida, U.S. Pat. No. 3,637,297, developed his 35 mm 2-perforation film system that used the same image areas as Techniscope in 1965. Because of the improved quality of contemporary motion picture film, compared to that available when Yoshida reduced his invention to practice, there are a number of advantages available today, through image capture in the film format described in the present invention. Much of the Yoshida invention was based on new cameras and projectors designed for photography and presentation of film in his format, which still did not use the entire image area, from sprocket hole to sprocket hole, as the present invention does.

The available width of the film format used in the present invention allows an aspect ratio as wide as 2.61 to 1, which is comparable to that used in Cinerama, if the entire frame is filled with picture information, from sprocket hole to sprocket hole. The level of spatial and temporal resolution available with the invention, using the frame rate of 48 frames-per-second, is comparable to or exceeds that available at 24 frames-per-second with either 35 mm conventional film or digital post-production and projection at 24 frames-per-second. The viewing experience available with this invention also exceeds that available with 70 mm, 5-perforation film at 24 frame-per-second projection, which has long been recognized as the industry standard for high-performance theatrical motion picture exhibition.

One of the original uses of the 2-perforation format was to store 24 images for each eye, photographed during each second, for a 3D "over and under" presentation. Thus, the preferred format for the present invention can also store 48 discrete images per second on the same amount of film stock that was conventionally used to store 24 images per second. The advantages of film projection at 48 frames per second were demonstrated in Weisgerber, U.S. Pat. No. 5,627,614 (1997). Similar advantages at other frame rates were demonstrated in Weisgerber, U.S. Pat. No. 5,739,894 (1998). These advantages included smoother interpolation of motion than was available with the convention 24-fps frame rate, suppression of flicker and ability to use a significantly brighter light (17 footlamberts or more) than was possible through conventional exhibition methods (12 to 16 footlamberts). Weisgerber 614 also taught a method for alternating between scenes or film sequences that deliver a "high-impact" look and other scenes or sequences yielding a traditional "cinematic" look, within the same motion picture. Weisgerber has also developed a method for converting motion pictures photographed at twenty-four frames per second for projection at forty-eight frames per second, with the benefit that the films so produced deliver the visual benefit of exhibition at the higher frame rate. (Weisgerber: Method for Exhibiting Motion Picture Films at a Higher Frame Rate than that in which which they were Originally Produced, U.S. patent application Ser. No. 11/478,940, filed Jun. 30, 2006 and continuations-in-part.

Demonstration of the invention described here has shown that digital exhibition at the rate of forty-eight images per second (equivalent to projection of film at forty-eight frames per second) produces a "dimensional" effect on the viewers of motion picture displayed at that speed. This is not equivalent to a 3D presentation, but it does add effects that go beyond the flat appearance of conventional two-dimensional (2D) film presentation at twenty-four frames per second. This dimensional illusion is inherent in the high rate of image delivery. It is, therefore, an objective of the present invention to deliver the advantages made possible by the techniques taught in Weisgerber 614 through the use of digital motion picture exhibition methods.

The net result of the use of this invention is to produce a superior cinematic product, in an economical manner, which delivers a viewing experience to the audiences of such motion pictures that was not previously available. The end product is a value-added presentation that draws audiences into motion picture theaters, while allowing motion pictures to be produced more economically than is the current industry practice.

BRIEF DESCRIPTION OF THE INVENTION

The invention delivers a significant improvement in the quality of the theatrical presentation of a motion picture, as seen by the viewers in commercial theaters. This is done through the use of a compact film format for photography, along with digital post-production and projection. Both are accomplished of 48 frames per second. The 35 mm, 2-perforation film format is used in the practice of the invention, and the entire width of the film, from sprocket hole to sprocket hole, is available for a super-wide image to be photographed and projected. Photography at 48 frames per second, as an essential element of the invention, delivers improved temporal and spatial resolution, compared to conventional 24-frame-per-second photography. The quality of the resultant images is comparable to large-format film images photographed and exhibited according to the prior art at 24 frames-per-second. In other words, the look is similar to that of 70 mm film, with images photographed at 24 frames per second. This is especially important for projection onto large screens, which are often 60 feet wide, or even wider in some cases, as shall be described.

The present invention combines the economy and other advantages of photography on 35 mm, 2-perforation film with digital image treatment and exhibition. Motion pictures are photographed in the 2-perforation format at 48 frames per second, through spherical lenses. Thus, 48 discrete images are acquired every second, using conventional means, on the same amount of film stock used to capture 24 images per second in conventional 35 mm (4-perforation format) cinema photography. The use of spherical lenses allows more light to reach the film, wider focal-length lenses can be used, and greater depth of field is obtainable than with anamorphic lenses. The 35 mm, 2-perforation format uses the same amount of film for photographing 48 discrete images each second that the conventional (4-perforation) 35 mm format requires for 24 discrete frames per second.

The film images are then scanned by means known in the art to produce digital images. The n newly-digitized images have a super-wide aspect ratio of 2.61 to 1 or a nominal aspect ratio of 2.35:1 to 2.4:1. It is anticipated that the aspect ratio selected will be compatible with contemporary digital cinema exhibition, such as 1080 by 2048 pixels (standard 2K digital projection) or 1080 by 1920 pixels, to yield the 16 by 9 aspect ratio compatible with HDTV. For standard wide-screen (aspect ratio of 2.35 to 1 or 2.4 to 1) digital cinema projection, the images are compressed to 1.77 to 1 aspect ratio, which requires a 25% squeeze in the horizontal direction to accommodate the aspect ratio of the digital display medium. On projection, the images are shown through an anamorphic lens objective to stretch them in the horizontal direction, resulting in an image with an aspect ratio of 2.35:1 to 2.4:1, or as much as 2.61 to 1 (letterbox).

A super-wide aspect ratio of 2.61 to 1 can be obtained by using the entire available width of the mm film frame, from sprocket hole to sprocket hole. Although the conventional 35 mm film format leaves a portion of that width available for storing a sound track, there is no need to use a sound track in the practice of this invention The extra horizontal space which this format provides allows for photography of any motion picture that can be presented in any ultra-wide format presentation format that has been developed. Scenes can be photographed using spherical lenses (preferred embodiment), which allow more light to reach the film, wider focal length of lenses and greater depth of field than is obtainable with anamorphic lenses.

With raw film images that are wide enough to accommodate any presentation format, the flexibility to re-size those images during post-production, for the desired format, is maximized. This invention allows aspect ratios as wide as 2.61:1. The widest aspect that was used in the commercial cinema prior art was 2.59:1, the native aspect ratio of Cinerama. A wider image can be presented in the practice of this invention, with greater economy and ease of operation; Cinerama required three strips of 35 mm film and three synchronized projectors. Only a single film strip and projector are required it he practice of the present invention. In the present invention, the images are formatted for ascending film frame sequence.

The re-sized images are stored as data, using methods known in the art. For exhibition, a 3D-enabled server is required. For 3D operation (as opposed to conventional digital cinema operation at 24 images per second), the server and projector delivers an image for the left eye and an image for the right eye 24 times each second and also interleaves each pair of images for display by the projector. In 3D operation, images for the two eyes are interleaved either three times ("passive" method, using projected polarized light) or twice ("active" method using switching devices in the glasses worn by the viewers). In the present situation, the operation of the server and digital projector are modified to produce and show 48 images each second, without the operation of interleaving between left-eye and right-eye images. This is equivalent to the film projection at 48 frames per second, with the added benefits inherent in digital projection.

The "active" system of 3D presentation currently in commercial use involves projection of polarized images, with different polarization for each eye and interleaving each pair of images three times. This interleaving operation significantly reduces the amount of picture information that can be displayed to the audience when a digital cinema projector operates in 3D mode. Thus, 3D presentation has a wide-screen appearance, but at the cost of a significant sacrifice of information in the vertical direction. Conventional 3D digital projection displays an image only 720 pixels tall, with the standard width of 2048 pixels. Without the interleaving function required for 3D presentation, the projector can display 48 images per second at the standard image size of 1080 by 2048 pixels. Thus, the present invention uses certain features of standard digital 3D presentation, while specifically disabling and not using other features. This allows the display of 50% more picture than is visible through conventional digital 3D projection.

BRIEF DESCRIPTION OF THE DRAWINGS

FIG. 1 shows a strip of motion picture film photographed in the 35 mm, 2-perforation film format.

FIG. 2 shows images captured on the strip of motion picture film after they have been digitally improved and re-sized for digital exhibition according to the invention described. The images are paired to indicate dual-stream data as fed from server to digital cinema projector.

FIG. 3A shows a sequence of digital images formatted for three-dimensional exhibition.

FIG. 3B shows the same sequence of images depicted in FIG. 2, for comparison.

Figure 4:
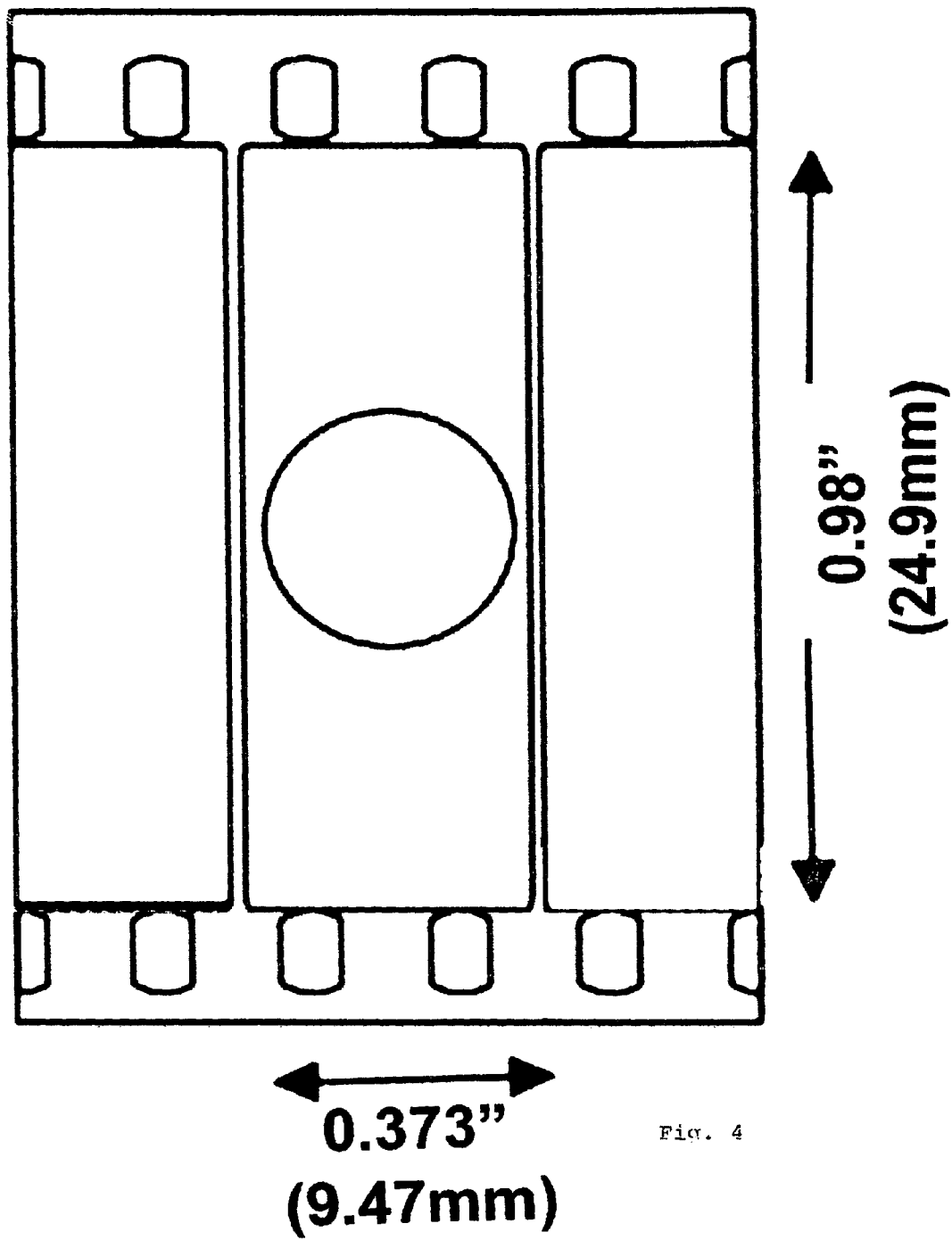
FIG. 4 shows the format used for image capture according to the practice of the invention, with dimensions of the space available for the image.

Audio and other non-picture information is not depicted.

DETAILED DESCRIPTION OF THE INVENTION

The method of this invention can be summarized as follows. First, a two-perforation format on 35 mm motion picture film is used for photography. This format captures images with a super-wide aspect ratio, as described. Second, the film is processed and then images are converted to digital form, through means known in the art. Third, the digital images are scanned and re-sized for ease of management of the data that comprise the images. Fourth, post-production steps are accomplished through means known in the art. Fifth, the images are formatted for ascending frame sequence. Although a 3D-enabled server is used according to the practice of the invention, the server and projector are used to display 48 continuous ascending images each second, rather than the interleaved images displayed in 3D presentation In addition, the images are formatted for digital projection. Last, the motion picture is presented to theatrical audiences, with the desired aspect ratio, at 48 frames per second. If film presentation is desired as an alternative to digital presentation, the last two steps are replaced with conversion of the digital images onto film.

The film gauge used in the practice of the invention is a 2-perforation format for 35 mm film. It is different from conventional 35 mm film formats. FIG. 4 shows the format used in accordance with the invention. It calls for the use of the entire available horizontal area, from sprocket hole to sprocket hole. This allows more width to be used to capture the image. In the format used in the practice of the invention, there is 0.98 inch or 24.9 mm available, while the 2-perforation format with room for a sound track only allows 0.864 inch or 21.95 mm of available horizontal space. The standard 2-perforation film gauge permits an aspect ratio of only 2.316:1, while the format used in the practice of the invention allows an aspect ratio of 2.61:1 without sacrificing any image height.

The present invention utilizes digital projection at forty-eight frames per second, along with photography at the same rate. Temporal and spatial exhibition is doubled, compared to conventional (twenty-four images per second) digital cinema and 35 mm film exhibition, because of the high frame rate image capture and projection. The information actually delivered to the audience is double the amount delivered through conventional exhibition. This improves the quality of the image, which delivers more than twice the effect obtainable with conventional exhibition, because of synergistic effects. Thus the presentation exhibited by a 2K digital projector in the practice of the present invention can equal the perceived quality obtained with 4K or 6K digital projection. In the practice of the present invention, the DLP Chip Projector (Digital Light Processor) manufactured by Texas Instruments is suitable and has actually been used for demonstration purposes.

As previously noted, a motion picture film is photographed, using the 35 mm, 2-perf format. Operationally, this is similar to conventional motion picture photography, except that 48 images are photographed each second. Photography is accomplished through a spherical lens, as in the conventional motion picture art. The use of a spherical lens is more economical and operationally simpler than photography through an anamorphic lens. It also delivers a sharper and clearer image than is available through an anamorphic camera lens, due to the optical complexity of the anamorphic lens objective. Moreover, the optical simplicity of the spherical lens, compared to the anamorphic lens, permits the use of lenses with shorter focal lengths, and provides for a greater depth of field. This improves overall image quality.

Motion picture photography utilizing the film format specified for this invention uses the same amount of film stock as conventional (24-fps) 35 mm photography, except that the present invention allows twice as many images to be stored on the same length of motion picture film. A sequence of film images photographed according to the invention is shown in FIG. 1. In FIG. 1, Images 10 through 17 are photographed sequentially and represent images that viewers will eventually see during the interval of one sixth of a second.

Once the images have been captured, they are scanned for conversion to digital images, according to means known in the art. The images are enhanced as needed to reduce undesirable artifacts and improve image sharpness. Again, these methods are known in the art. Then the images are re-sized for compatibility with digital exhibition formats and aspect ratios currently in use or otherwise feasible in the practice of the invention, such as an ultra-wide format with an aspect ratio of 2.61:1. A sequence of images after this treatment is shown in FIG. 2. Images 20 through 27 contain the same information as Images 10 through 17 in FIG. 1, except that Images 20 through 27 have been digitally enhanced an re-sized for exhibition Again, viewers will eventually see Images 20 through 27, during the interval of one sixth of a second.

In the practice of the invention, the images are stored as dual-stream data and delivered on a 3D-enabled server and delivered to a digital cinema projector for digital exhibition. The use of a 3D-enabled server is important to the practice of the invention, as shown in FIG. 2. FIG. 3B is a repetition of FIG. 2, depicting eight sequential images prepared for exhibition according to the invention described. FIG. 3A shows four images, 30/30', 31/31', 32/32' and 33/33') prepared for 3D exhibition in the conventional manner, with Images 30, 31, 32 and 33 prepared for the left eye and Images 30', 31', 32' and 33' prepared for the right eye. It should be noted that four 3D images (FIG. 3A) originally photographed at 24 frames per second, use the same amount of film stock as eight images (FIG. 3B) photographed at 48 frames per second, in the practice of the invention described.

In the "conventional" 3D presentation, two images at a time are seen by the viewer, with interleaving to produce left-eye and right-eye images. The presentation of interleaved images reduces stroboscopic appearance, thus delivering a "smooth" look with 3D presentation. In 3D presentation, for example, Images 30, 30', 31 and 31' represent two images for the left eye (30 and 31) and two images for the right eye (30' and 31'). During the time those two images are revealed, the viewers are given three opportunities to view these two images, with alternating presentation for the two eyes; L/R/L/R/L/R. Then the next image sequence (32,32',33 and 33') is shown in the same manner. This continues for the entire length of the motion picture. The projector shows films photographed at twenty-four frames per second, even though it reveals forty-eight images each second; twenty-four for the left eye and twenty-four for the right eye. This process is followed in digital 3D presentation to ensure that each eye sees separate images not seen by the other eye. Viewers of the presentation wear glasses that polarize the light on the screen differently for each eye. Images designed to be seen by the left eye are polarized to match the lens over the left eye, while images for the right eye are polarized to match the lens over the right eye. This is different from the 3D systems used in some special venues, where active switching devices are contained within the frames of the glasses worn by the viewers, as the means for switching between "right" and "left" for filtering.

In the practice of the present invention, the means for alternating between left-eye and right-eye viewing (interleaving operation) is disabled. Thus, the projector allows forty-eight discrete images every second, and the "3D" interleaving feature is not employed. It is specifically disabled by new commands to the projector to default to an image cadence used exclusively in the practice of the invention described here; a continuous forty-eight image-per-second display. This presents a number of advantages over conventional film exhibition and digital 3D exhibition, since the interleafing operation adds judder and stroboscopic effects which are absent with the invention described here. Moreover, the data required to operate the interleaving operation substantially reduces the amount of picture information that can be delivered to the audience. The digital 3D projection format is 720 by 2048 pixels, only two-thirds the size of the standard format for digital projection at 1080 by 2048 pixels. The present invention uses the full digital format, with its delivery of 50% more picture information and similarly more light. In effect, the invention described can deliver the benefits of 48-fps projection and increased light available according to Weisgerber 614, through digital means.

It should be noted that the dimensions of 0.98 by 0.373 inches (24.9 by 9.47 mm) as shown in FIG. 4, yields an aspect ratio of 2.61 to 1, if the entire space of the film frame, from sprocket hole to sprocket hole, is filled. In order to accommodate a wider image, not all of the available height on the film frame will be used. For example, in order to produce an aspect ratio of 2.4 to 1, only 0.361 inch of the available 0.373 inch of height is used. It should be noted that using the full width and height available delivers an image wider than any commercial cinema format has used until now; the widest commercial format was Cinerama, with an aspect ratio of 2.59 to 1. For example, in order to produce an aspect ratio of 2.4 to 1, only 0.361 inch of the available 0.373 inch of available height is used. Thus, the widest image that would be used in the practice of this invention utilizes the entire available width of the film frame, and 89% of the available height.

Weisgerber 614 taught the use of a film projector operating at forty-eight frames per second with a double-bladed shutter, so that ninety-six flashes occurred during each second of the running time of the motion picture. This feature allowed the use of brighter light (in excess of sixteen footlamberts) than is feasible under conventional motion picture projection (normally twelve to sixteen footlamberts). The same is true in the practice of the present invention. Digital projectors have no shutter, and dark time between images is so short as to be imperceptible to the viewers. Therefore, a light level of seventeen footlamberts or higher is feasible according to this invention. This is comparable to the light level achievable with 70 mm, 48-fps film projection in accordance with Weisgerber 614. It is also significantly higher than the brightness levels employed with conventional digital exhibition (twelve to fourteen footlamberts) that replicates the "conventional" film speed of twenty-four frames per second. In conventional film exhibition, a light level in excess of sixteen footlamberts is sufficient to cause flicker. Because of the large number of discrete images presented every second, flicker is eliminated with the present invention.

While the present invention is not a true "3D" presentation, it nonetheless delivers the appearance of "dimensionality" that is not perceived with conventional film of digital exhibition at twenty-four frames or images per second. The lack of undesirable artifacts and smoother appearance of motion than is conventionally available combine to produced a dimensional effect that simulated real-life appearance to viewers more effectively than is otherwise available in a motion picture theater.

A significant feature of Weisgerber 614 is that selected scenes or sequences in a motion picture are photographed at twenty-four frames per second and double-frame printed, while other scenes or sequences are photographed at forty-eight frames per second. The entire motion picture is then projected at forty-eight frames per second, so certain parts of the motion picture film retain a "cinematic" appearance, while the rest of the motion picture has a "high-impact" look. Weisgerber 614 taught the use of brighter light levels (16.5 footlamberts or more) for the "high-impact" portions of the motion picture, than are delivered during the portions or the picture that are photographed at twenty-four frames per second (10.9 footlamberts). This allows more dynamic color imagery and increased contrast, for a more lifelike appearance. These factors combine to deliver the desired effect for the specific portions of the motion pictured designed to deliver the "high-impact experience to the audience.

The present invention retains this feature. Certain scenes or sequences are photographed at twenty-four frames per second, while other scenes or sequences are photographed at forty-eight frames per second. The 35 mm, 2-perforation format is used for all photography. For the images photographed at twenty-four frames per second, the digital data representing those images is repeated for data storage and theatrical exhibition. This is the equivalent of double-frame printing of film images. The images that comprise the portions of the motion picture photographed at forty-eight frames per second are stored only once for exhibition. Light brightness can also be turned "up" for portions of the motion picture originally photographed at forty-eight frames per second and "down" for portions of the motion picture originally photographed at twenty-four frames per second. The means for doing this is described fully in Weisgerber 614.

It is envisioned that motion pictures will be photographed and exhibited as previously described on a commercial basis, so that particular embodiment of the invention is the preferred one; However, there are other possible embodiments that utilize the novel features of the present invention.

The invention is not limited to a "wide-screen" presentation with an aspect ratio of 2.4 to 1, or an approximation of that ratio. The size of the frame can also be reduced to accommodate the nominal aspect ratio of 1.85 to 1, which is typically associated with the 35 mm film format. Alternatively, the full width of the 35 mm film format can also be used for an "ultra-wide-screen" presentation with an aspect ratio approximating 2.61 to 1. The reformatting of images is done in the same manner as with the 2.4 to 1 aspect ratio, except the amount of image compression on reformatting and expansion in projection is greater.

While the present invention is designed for use with 35 mm film with each image being "two perforations" high, Weisgerber 614 envisioned the use of the 65/70 mm film format for best results. While the 35 mm, 2-perforation format is suitable for the present invention, an even greater advantage can be obtained through the use of the 65 mm, 5-perforation format. Since 65 mm film can store significantly more information than 35 mm film, digital treatment of 65 mm film images will yield a proportionately higher pixel count than similar treatment of images photographed onto 35 mm film. Digital resizing of 65 mm images in the 5-perforation format also accommodates enlargement of those images in the vertical direction to make them taller than the conventional aspect ratio of 65/70 mm, 5-perforation film (2.35:1 to 2.4:1) allows. The original film can be photographed through an anamorphic compression lens to squeeze an image in the vertical direction for acquisition purposes and then digitally expanded in the vertical direction as part of the resizing operation for exhibition.

In addition, digital motion picture cameras commercially available with variable frame-rate capture (i.e. forty-eight frames per second for slow motion effects) can also be used for image acquisition, instead of film photography. In that embodiment, film-to-digital conversion is not required, unless it is needed for special effects of improvement of images (such as sharpening the images or improving steadiness). However, the method of exhibition is the same as described in the practice of the present invention; forty-eight discrete images are digitally captured for each second of viewing time. Use of a 3D-capable server and digital projector is the same as in the description of the preferred embodiment of the invention, and the forty-eight discrete images that were digitally acquired are presented to the viewers during each second in the manner also described.

The invention also improves economy of image storage, through the use of the 35 mm, 2-perforation format. The format requires half the amount of film that the conventional 4-perforation format requires. Film is also a better storage medium than digital image storage, since digital images are unstable over time and can become corrupted, and must be cloned every few years to prevent them from becoming irretrievable. Images stored on film can last for over a century; perhaps for hundreds of years. Some of the images photographed during the earliest days of film still exist; the only limiting factor being the image stability on the physical film itself

The invention claimed is:

1. A method for photographing and exhibiting motion pictures to theatrical audiences, comprising:
   a. acquiring motion picture images by means of photography on motion picture film, in the thirty-five millimeter format with an image height of two perforations per frame, at the frame rate of forty-eight frames per second,
   b. converting said images to digital format, and c. exhibiting such images to such audiences by means of digital projection at the frame rate of forty-eight frames per second.

2. The method as in claim 1, in which each image measures 0.98 inch or 24.9 millimeters horizontally and 0.373 inch or 9.47 millimeters vertically, said vertical measure being substantially equal to the space occupied by two sprocket hole perforations on thirty-five millimeter motion picture film, and said horizontal measure being substantially equal to the space on said film from sprocket hole to sprocket hole.

3. The method as in claim 1, in which said images are photographed and presented in a format that delivers an aspect ratio as narrow as 1.77 to 1 and as wide as 2.61 to 1, or any aspect ratio in between.

4. The method as in claim 1, in which said images are photographed through spherical lenses.

5. The method as in claim 1, in which said images are re-sized to accommodate a digital motion picture image format during the process of conversion from film images to digital data.

6. The method as in claim 1, in which data representing the motion pictures to be shown to said theatrical motion picture audiences is delivered through the use of a server that is compatible with three-dimensional (3D) digital motion picture presentation.

7. The method as in claim 6, in which the function of said server that interleaves images intended to be seen through the left eye of each of the viewers of said motion pictures, with images intended to be seen through the right eye of each of the viewers of said motion pictures, is disabled and not used.

8. The method as in claim 1, in which forty-eight discrete images are exhibited every second during the length of the entire motion picture.

9. The method as in claim 1, in which projection of said motion pictures is accomplished at light levels of seventeen footlamberts or more.

10. The method as in claim 9, in which projection of said motion pictures is accomplished at light levels of seventeen footlamberts or more for certain scenes or image sequences forming a portion of said motion pictures, while other scenes or image sequences are projected at light levels of twelve to fourteen footlamberts.

11. A method for photographing motion picture images on thirty-five-millimeter motion picture film, with each image occupying two perforations of height, and eventually projecting said images for theatrical motion picture exhibition, whereby forty-eight discrete images are photographed on film and projected by digital means to motion picture audiences during each second of the duration of the motion pictures exhibited to said audiences.

12. The method as in claim 11, whereby said projection is accomplished by means of a server compatible with three-dimensional motion picture data storage and exhibition.

13. The method as in claim 12, whereby the feature of such server that interleaves images intended to be viewed with the left eye of each of the members of the audience viewing such motion pictures, with images intended to be viewed with the right eye of each of the members of the audiences viewing such motion pictures, is disabled and not used.

14. The method as in claim 1, in which said film contains motion picture images two perforations high in the thirty-five millimeter format, with picture information imparted to enough of the width of each frame of said motion picture film to produce an aspect ratio as wide as 2.61 to 1; such picture information photographed upon said frames; said photographed images thereupon being later converted to digital form, processed and still later projected to audiences in motion picture theaters at forty-eight frames-per-second.

15. A method for acquiring and exhibiting motion picture images to theatrical audiences, whereby the improvement comprises the use of a thirty-five millimeter, two-perforation film format for acquisition of such images, along with the use of digital projection at a high frame rate of forty-eight frames per second, for compatibility with wide-screen motion picture exhibition formats.

* * * * *